US006437282B1

(12) United States Patent
Thornton et al.

(10) Patent No.: US 6,437,282 B1
(45) Date of Patent: Aug. 20, 2002

(54) LASER MICRO-MACHINING OF SEAMED BELTS

(75) Inventors: Constance J. Thornton, Ontario; T. Edwin Freeman, Webster; Theodore Lovallo, Williamson; Edward L. Schlueter, Jr., Rochester; Joseph A. Swift, Ontario; Xiaoying Elizabeth Yuan, Fairport; Santokh S. Badesha, Pittsford, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/676,123

(22) Filed: Sep. 29, 2000

(51) Int. Cl.$^7$ .............................................. B23K 26/38
(52) U.S. Cl. ............................................... 219/121.69
(58) Field of Search ....................... 219/121.68, 121.69, 219/121.72; 156/272.8

(56) References Cited

U.S. PATENT DOCUMENTS

| | | | |
|---|---|---|---|
| 5,487,707 A | 1/1996 | Sharf et al. .................. | 474/253 |
| 5,514,436 A | 5/1996 | Schlueter, Jr. et al. ........ | 428/57 |
| 5,549,193 A | 8/1996 | Schlueter, Jr. et al. ... | 198/844.2 |
| 5,688,355 A | * 11/1997 | Yu ........................... | 156/272.8 |
| 5,721,032 A | 2/1998 | Parker et al. ................. | 428/57 |
| 5,961,860 A | * 10/1999 | Lu et al. ................. | 219/121.68 |
| 6,068,722 A | 5/2000 | Yu et al. ..................... | 156/137 |
| 6,318,223 B1 | 11/2001 | Yu et al. ........................ | 83/13 |

FOREIGN PATENT DOCUMENTS

JP    11-263415 A    *  9/1999

* cited by examiner

*Primary Examiner*—Geoffrey S. Evans
(74) *Attorney, Agent, or Firm*—John M. Kelly; Joseph M. Young (57) ABSTRACT

Puzzle-cut imageable seam intermediate transfer belts having a large seam surface area, and marking machines that use such imageable seam intermediate transfer belts. A belt is formed from a semiconductive substrate having a puzzle-cut first end and a puzzle-cut second end that are mated to form a seam. The first end includes a first tongue and the second end includes a second tongue that form a rabbeted joint such that the outer surface of the belt is substantially smooth across the seam. An adhesive is disposed over the rabbeted joint. The tongues may include mechanical locking features, such a protrusion and a channel, that mate. The mechanical locking features may be continuous along the seam.

14 Claims, 6 Drawing Sheets

LASER MICRO-MACHINING OF SEAMED BELTS

FIELD OF THE INVENTION

This invention relates to seamed belts.

BACKGROUND OF THE INVENTION

Electrophotographic printing is a well-known and commonly used method of copying or printing documents. Electrophotographic printing is performed by exposing a light image representation of a desired document onto a substantially uniformly charged photoreceptor. In response to that light image, the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated for a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems, successive toner layers are electrostatically tranferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from the belts as required to fulfill the requirements of the machine's overall architecture.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case, the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is long. While seamed intermediate transfer belts are relatively low in cost, the seam introduces a discontinuity that interferes with the electrical, thermal, and mechanical properties of the belt. While it is possible to synchronize a printer's operation with the motion of the intermediate transfer belt so that toner is not electrostatically transferred onto the seam, such synchronization adds to the printer's expense and complexity, resulting in loss of productivity. Additionally, since high speed electrophotographic printers typically produce images on paper sheets that are cut from a continuous paper "web," if the seam is avoided the resulting unused portion of the paper web must be cut-out, producing waste. Furthermore, even with synchronization, the mechanical problems related to the discontinuity, such as excessive cleaner wear and mechanical vibrations, still exist. However, because of the numerous difficulties with transferring toner onto and off of a seamed intermediate transfer belt, in the prior art it was necessary to avoid toner transfer onto (and thus off of) a seam.

Acceptable intermediate transfer belts require sufficient seam strength to achieve a desired operating life. While that life depends on the specific application, typically it will be at least 100,000 operating cycles, but more preferably 1,000,000 cycles. Considering that a seamed intermediate transfer belt suffers mechanical stresses from belt tension, traveling over rollers, moving through transfer nips, and passing through cleaning systems, achieving such a long operating life is not trivial. Thus the conflicting constraints of long life and limited topographical size at the seam places a premium on adhesive strength and good seam construction.

A prior art "puzzle-cut" approach to seamed belts significantly improves the seam's mechanical strength. U.S. Pat. No. 5,514,436, issued May 7, 1996, entitled "Puzzle Cut Seamed Belt;" U.S. Pat. No. 5,549,193 entitled "Endless Seamed Belt with Low Thickness Differential Between the Seam and the Rest of the Belt;" and U.S. Pat. No. 5,487,707, issued Jan. 30, 1996, entitled "Puzzle Cut Seamed Belt With Bonding Between Adjacent Surface By UV Cured Adhesive" teach the puzzle-cut approach. While the puzzle-cuts described in the forgoing patents improve the seam's strength, further improvements would be beneficial. Furthermore, there are other difficulties when transferring toner onto and off of a seam of a seamed intermediate transfer belt.

For a seamed intermediate belt to be acceptable, the final image produced from across the seam must be comparable in quality to images formed across the remainder of the belt. This is a difficult task due to a number of interrelated factors. Some of those factors relate to the fact that the seam should not greatly impact the electrostatic fields used to transfer toner. However, electrostatic transfer fields are themselves dependent on the electrical properties of the intermediate transfer belt. While this dependency is complex, briefly there are conditions where transfer fields are very sensitive to the resistivity and thickness of the materials used for the various layers of the intermediate transfer belt. Under other conditions the electrostatic transfer fields are relatively insensitive to those factors. Similarly, there are conditions where the electrostatic transfer fields are very sensitive to the dielectric constants of the materials used for the layers of the intermediate transfer belt, and other conditions where the electrostatic transfer fields are insensitive to the dielectric constants. Therefore, to successfully transfer toner onto and off of a seamed intermediate transfer belt, the electrical properties across and around the seam should be carefully controlled to produce a proper relationship with the remainder of the belt. Since the electrical properties depend on the interrelated factors of seam geometry, seam construction (such as adhesive beyond the seam), seam topology, seam thickness, the presence of an overcoating, and various other factors those factors should be taken into consideration for a given application.

In addition to mechanical strength and electrical compatibility difficulties, there are other problems when transferring toner onto and off of a seam. For example, with most prior art seamed intermediate transfer belts relatively poor cleaning around the seam was acceptable because the seam region was not used in the printed image. However, if toner is being transferred onto and off of the seam region the seam must be properly cleaned. Thus, the toner release and friction properties across the seam region have to be comparable to those of the rest of the belt. Furthermore, most prior art seamed intermediate transfer belts have a significant "step" where the belt overlaps to form the seam. That step can be as large as 25 microns. Such a step significantly interferes with transfer and cleaning. Thus, if toner is transferred onto and off of the seam, the seam's friction, toner release, and topography are much more constrained than those of other seamed intermediate transfer belts. Furthermore, while the step of a puzzle-cut seamed belts is relatively small, belt tension can cause individual puzzle-cut petal to separate and lift from around neighboring petals. Such lifting introduces localized steps that interfere with blade-based belt cleaners. Such interference can seriously degrade belt and cleaner blade life.

From above it can be seen that a seam's topography is very important if one wants to transfer toner onto and off of a seam region without significant degradation of the final image. The seam topography includes not only the seam itself, but also any overflow of the adhesive used in the seam. This overflow can occur on both the toner-bearing side and the back-side of the belt. Adhesive overflow is important because the belt seam strength can depend upon on that overflow. However, excessive overflow increases various mechanical, electrical, and xerographic problems. Furthermore, the adhesive's electrical properties remain important.

More information regarding the requirements of imageable seam intermediate transfer belts can be found in U.S. Ser. No. 09/460,896 entitled "Imageable Seam Intermediate Transfer Belt Having An Overcoat," by Edward L. Schlueter, Jr. et al., and U.S. Ser. No. 09/460,821, entitled "Imageable Seam Intermediate Transfer Belt," by Gerald M. Fletcher et al., both filed on Dec. 14, 1999. Those patent documents discuss, among other things, "short-wavelength" and "long-wavelength" spatial disturbances, conformable overcoats, Paschen air breakdown, transfer nip air gaps, suitable electrical properties, material layers, material compositions, environmental and aging concerns, cleaning, surface friction, and "set point control" approaches to enable wider tolerances in electrical properties.

Because the importance of a seam's mechanical strength, it would be beneficial to have a method of fabricating a mechanically strong seamed belt. Even more beneficial would be a technique of quickly and economically fabricating a seamed belt that was suitable for producing mechanically strong belts. Particularly beneficial would be a technique suitable for quickly and economically fabricating strong, puzzle-cut imageable seam intermediate transfer belts.

SUMMARY OF THE INVENTION

The principles of the present invention provide for a technique suitable for producing mechanically strong seamed belts, quickly and economically, and in a manner that is suitable for fabricating puzzle-cut imageable seam intermediate transfer belts. That technique incorporates a laser micro-machining system having a laser source that produces a laser beam. That laser beam passes through beam shaping optics and then illuminates a mask. The mask selectively passes part of the laser beam from the beam shaping optics. The part of the laser beam that passes through the mask illuminates and micro-machines a belt substrate material so as to produce a structural feature on an end of the belt material such that the structure feature depends upon the mask. Another end of the belt material is then illuminated with a laser beam to produce a structural feature on that end of the belt material. The ends are then brought together with an adhesive between the laser-beam produced structural features. The adhesive is then cured, resulting in a seamed belt.

BRIEF DESCRIPTION OF THE DRAWINGS

Other features of the present invention will become apparent as the following description proceeds and upon reference to the drawings, in which.

DETAILED DESCRIPTION OF THE INVENTION

While the principles of the present invention are described below in connection with an embodiment of a laser micro-machining system for producing seamed belts having complex seam structures, it should be understood that the present invention is not limited to that particular embodiment. On the contrary, the present invention is intended to cover all alternatives, modifications, and equivalents as may be included within the spirit and scope of the appended claims.

Figure 1:
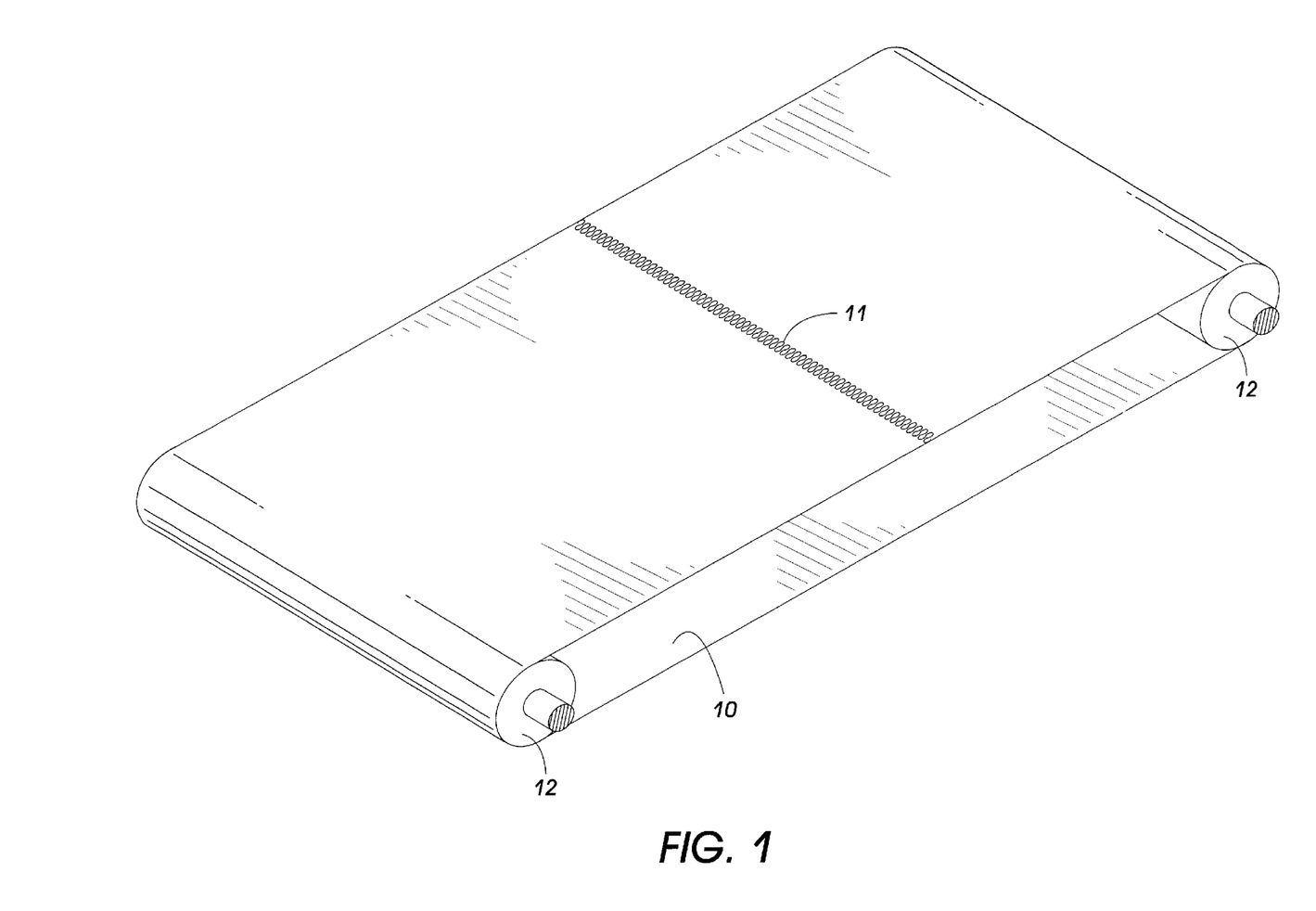
FIG. 1 is an isometric representation of a puzzle-cut seamed intermediate transfer belt.

An imageable seam intermediate transfer belt 8 is illustrated in FIG. 1. That belt includes a semiconductive substrate layer 10 that has its ends joined together to form a continuous belt using mechanically interlocking "puzzle-cut" tabs that form a seam 11. While the seam is illustrated as being perpendicular to the two parallel sides of the substrate layer the seam could be angled or slanted with respect to the parallel sides. Reference U.S. Pat. Nos. 5,487,707; 5,514,436; 5,549,193; and 5,721,032 for additional information on puzzle-cut patterns. Typically the seam 11 is about ¼ inch wide.

The substrate layer 10 can be made from a number of different materials, including polyesters, polyurethanes, polyimides, polyvinyl chlorides, polyolefins (such as polyethylene and polypropylene) and/or polyamides (such as nylon), polycarbonates, or acrylics, or blends or aloys of such materials. If required, the selected material is modified by the addition of an appropriate filler such that the substrate layer has a desired electrical conductivity. Appropriate fillers can include for example carbon, Accufluor® fluorinated carbon black, and/or polyanaline, polythiophene or other conductive fillers or polymers. Donor salts can also be used. The substrate layer material should have the physical characteristics appropriate to an intermediate transfer application, including good tensile strength (Young's modulus, typically $1 \times 10^3$ to $1 \times 10^6$ Newton's/m$^2$, resistivity (typically less than $10^{13}$ ohm cm volume resistivity, greater than $10^8$ ohms/square lateral resistivity), thermal conductivity, thermal stability, flex strength, and high temperature longevity. See the previously referenced U.S. patent applications Ser. No. 09/460,896, entitled "Imageable Seam Intermediate Transfer Belt Having An Overcoat," by Edward L. Schlueter, Jr. et al., and Ser. No. 09/460,821 entitled "Imageable Seam Intermediate Transfer Belt," by Gerald M. Fletcher et al., both filed on Dec. 14, 1999.

Figure 2:
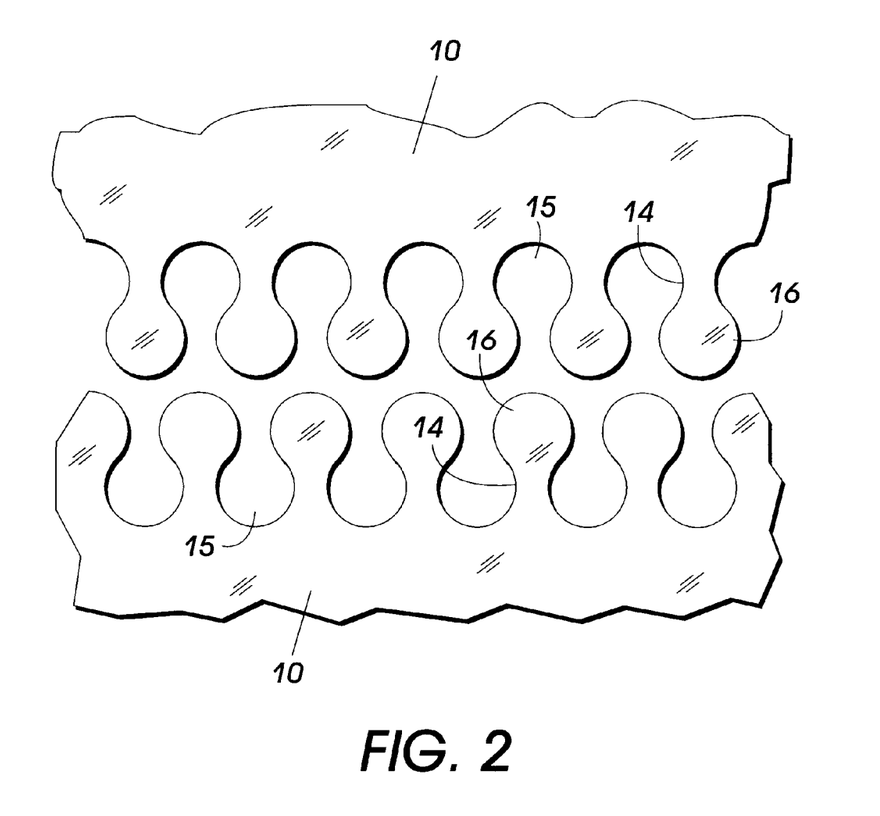
FIG. 2 is a top down view of the puzzle-cut tab pattern used in the belt of FIG. 1.

FIG. 2 shows a top view of the puzzle-cut tab pattern in more detail. Each tab is comprised of a neck 14 and a node 16 that fit into female 15 interlocking portions. The tabs are beneficially formed using a laser micro-machining system described subsequently. The interlocking tabs mate so as to reduce the stress concentration between the interlocking elements and to permit easy travel around curved members, such as rollers 12 shown in FIG. 1.

Figure 3:
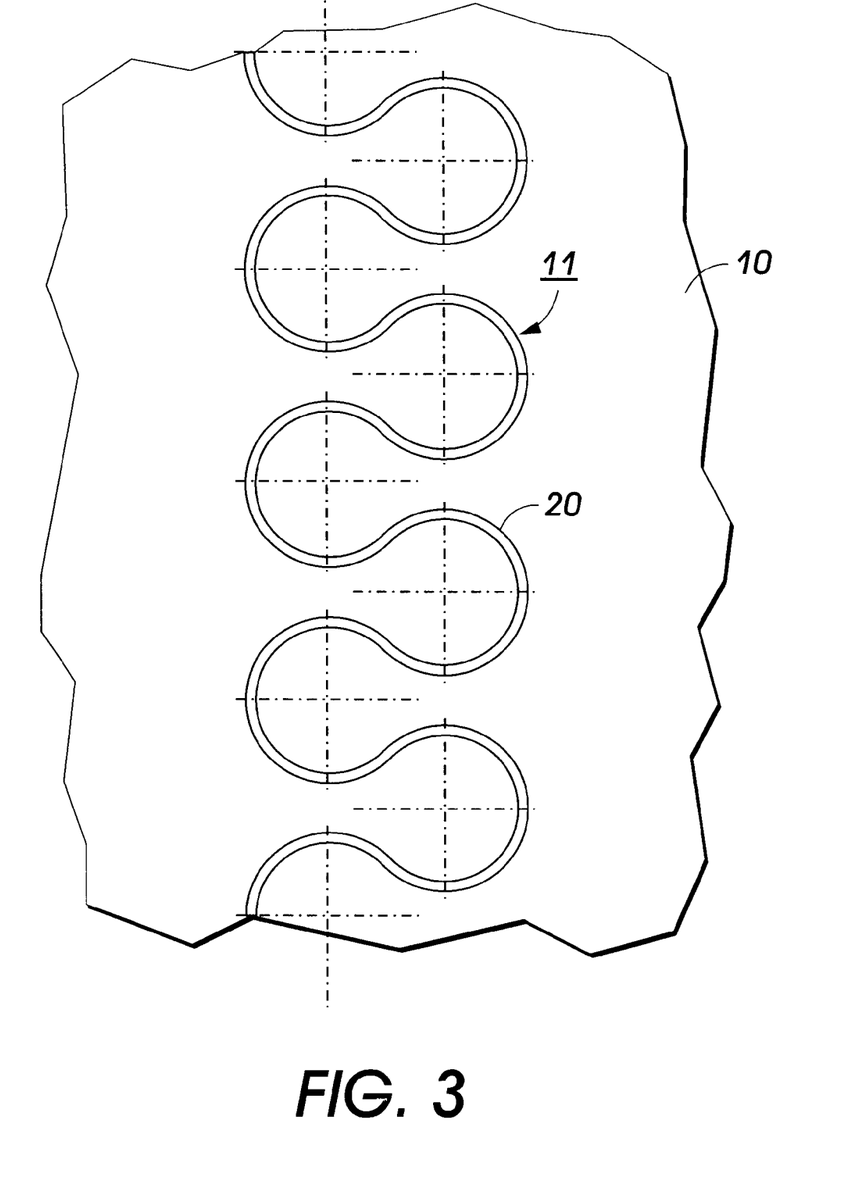
FIG. 3 shows the puzzle-cut tabs of FIG. 2 interlocked together.
Figure 4:
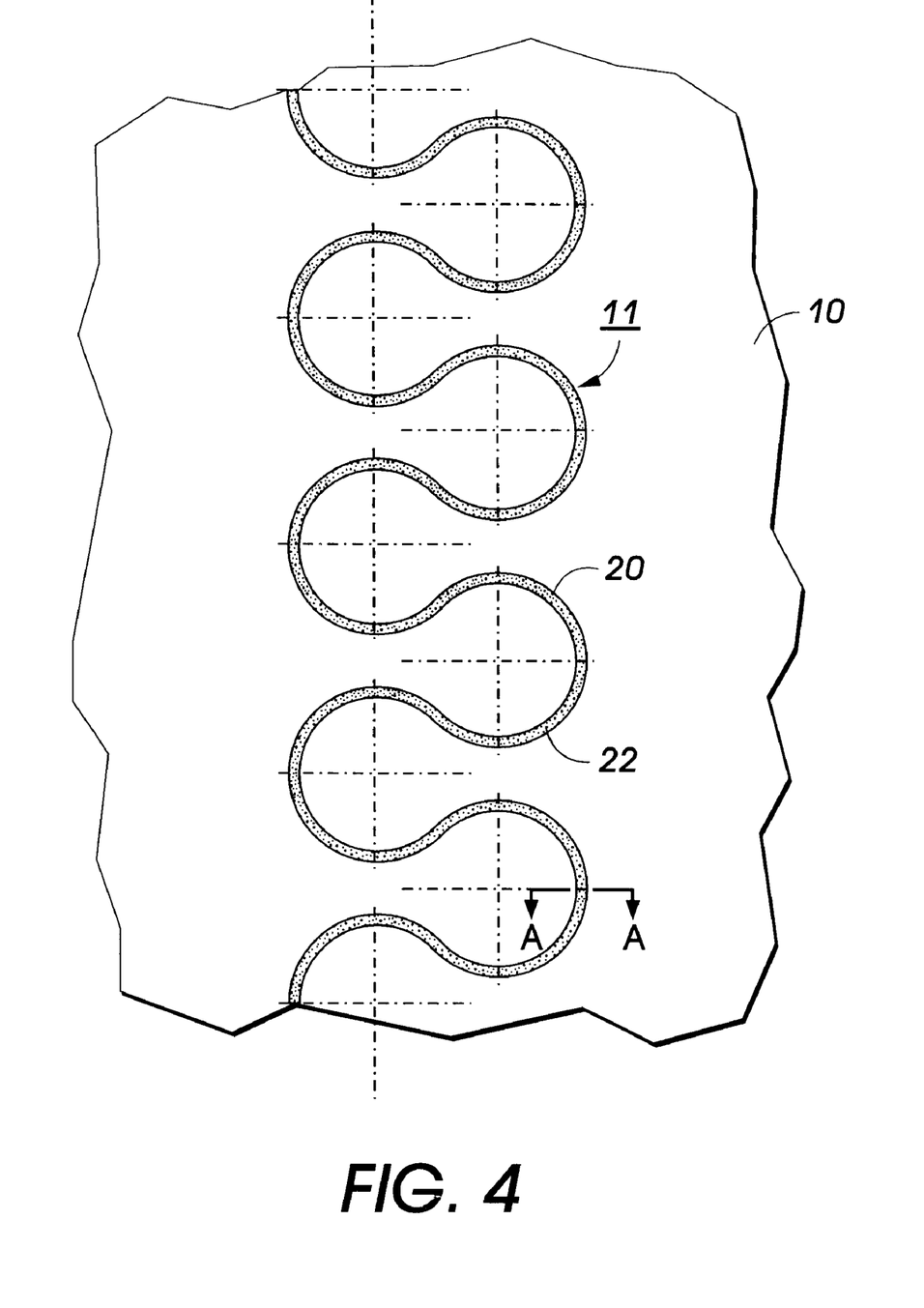
FIG. 4 shows the puzzle-cut tabs of FIG. 3 with the kerf filled with an adhesive.

FIG. 3 shows a top view of the puzzle-cut tabs of FIG. 2 interlocked together. Physically interlocking the puzzle-cut tabs may require pressure when mating the tabs. Interlocking produces a gap between the mutually mating elements that is called a kerf 20. As shown in FIG. 4 the interlocking tabs are held together using an adhesive 22 that fills the kerf. The adhesive is designed to be physically, chemically, thermally, mechanically, and electrically compatible with the substrate layer material. Seams with a 25 micron kerf have been typical for the puzzle-cut seam, while a kerf less than about 5 microns can be preferred.

Significantly, the adhesive and the puzzle-cut tabs act together to create a strong seam. Ideally the seam should be strong, smooth, and mechanically uniform. Belts according to the principles of the present invention differ from those of the prior art by adding various seam complexities along a third dimension, that being perpendicular to the seam planes in FIGS. 1–4. FIG. 4 identifies a section A—A, which will generally be used to locate various alternative embodiment seam structures in FIGS. 5 and 6.

It should be understood that a seam structure extends along the seam, and that the adhesive 22 is disposed both along the seam and across the seam structure. To that end, the adhesive should have a viscosity such that it readily wicks into the kerf. Additionally, the surface energy of the adhesive should be compatible with the substrate layer material such that the adhesive adequately wets and spreads. Furthermore, the adhesive should remain flexible and should adhere well to the substrate layer material. Finally, the adhesive also should have low shrinkage during curing. As an example, the adhesive can be a hot melt adhesive that is heated and pressed into the seam such that the adhesive is flattened, making it as mechanically uniform as possible with the substrate layer 10. Alternatively, the adhesive can be an epoxy-like material, a UV curable adhesive including acrylic epoxies, polyvinyl butyrals, or the like. Further, the "adhesive" can be substantially the substrate material itself, either applied during a separate adhesive application step or else by melting the two ends sufficiently to cause adhesion of the mutually mating elements. Finally, the adhesives may be electrically modified as required for the particular application. Following the application of the adhesive, the seam 11 can be finished by buffing, sanding, or micro polishing to achieve a smooth topography.

The relative electrical properties of the adhesive and the substrate are very important because they significantly affect the transfer characteristics of the resulting seam as compared to the transfer characteristics of the rest of the belt. Therefore, the adhesive should produce a seam that has electrical properties that corresponds to that of the substrate layer. That is, under operating conditions a seam should create an electrostatic transfer field in the toner transfer zones that is within at least 20%, preferably within 10%, of the electrostatic transfer field that is present for the remainder of the belt. Ideally, the seam electrical properties are substantially the same as the substrate layer and have substantially the same electrical property dependence as the substrate on all important factors, such environment, applied field, and aging. However, significant differences in electrical properties can be allowed for some imageable seam conditions as discussed subsequently. The adhesive electrical properties can be met by mixing fillers or additives with an adhesive. For example, an adhesive might contain silver, indium tin oxide, CuI, SnO2, TCNQ, Quinoline, carbon black, NiO and/or ionic complexes such as quaternary ammonium salts, metal oxides, graphite, or like conductive fillers and conductive polymers such as polyanaline and polythiophenes.

Figure 5:
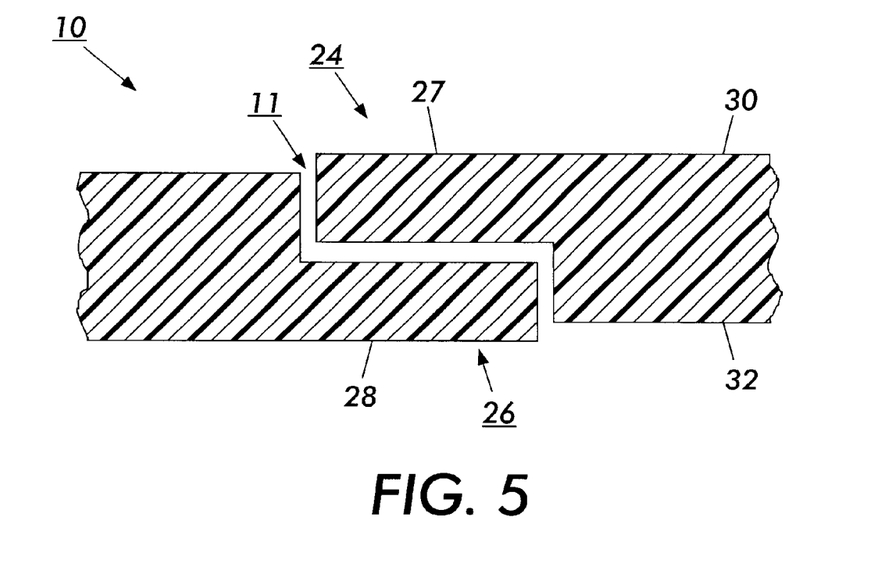
FIG. 5 shows a cross-sectional view of a first embodiment puzzle-cut seam structure that is in accord with the principles of the present invention.

FIG. 5 shows a first seam structure that can beneficially be fabricated using the principles of the present invention. The ends 24 and 26 of a belt 10 are cut to form rabbeted tongues 27 and 28 that fit together to form a seam 11 such that the outer surface 30 and the inner surface 32 of the belt are substantially flush across the seam. The tongues increase the seam surface area, enabling the adhesive 22 to form a stronger seam.

Figure 6:
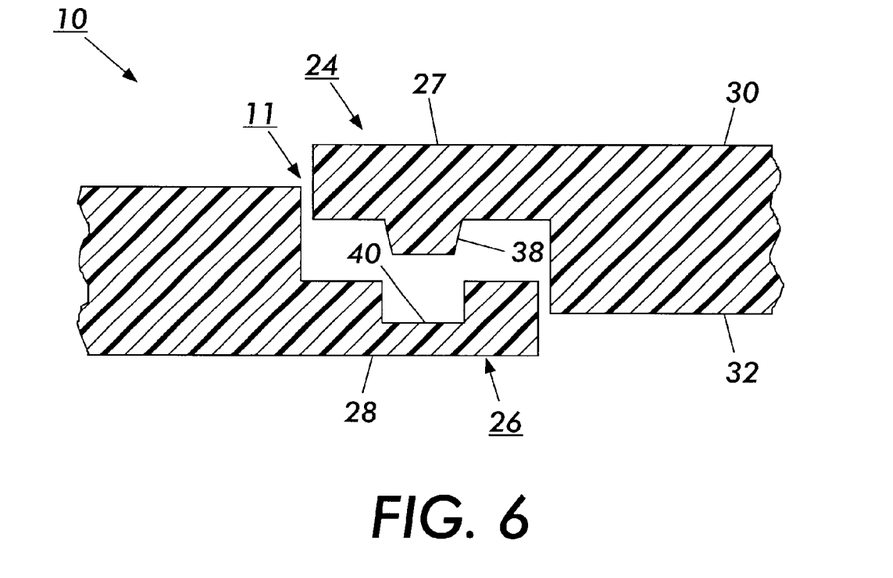
FIG. 6 shows a cross-sectional view of a second embodiment puzzle-cut seam structure that is in accord with the principles of the present invention.

FIG. 6 shows a second seam structure embodiment that can beneficially be fabricated using the principles of the present invention. Like the first seam structure, this structure includes rabbeted tongues 34 and 36 that fit together to form a seam 11 such that the outer surface 30 and the inner surface 32 of the belt are substantially flush across the seam. However, in this embodiment the tongue 34 includes a protrusion 38 that fits into a channel 40. The tongues 34 and 36 not only increase the seam's surface area, thus enabling the adhesive 22 to form a stronger seam, but the protrusion 38 and channel 40 add a mechanical impediment to seam separation. Of course, the increased seam area along the protrusion 38 also improves the strength of the seam.

Prior art puzzle-cut seamed intermediate transfer belts were usually fabricated from a blank, planar sheet of suitable belt material that was puzzle-cut, one end at a time, using an intricate and expensive mechanical puzzle-cutting die that extends across the width of the belt. This requires the belt blank to be aligned twice with the elongated die. After cutting, the ends are mechanically aligned, the puzzle-features interlocked to form a mechanically coupled seam, and a suitable adhesive is applied to the seam and cured to form a seamed belt. It is possible to modify this prior art process to produce 3-dimensional seam structures, for example, by including cutting, etching, grinding, or milling steps before interlocking the seam. However, the resulting process is slow, labor intensive, and not suitable for large scale, low cost precision manufacturing. A second prior art puzzle-cut seamed intermediate transfer belt fabrication process uses a laser to simultaneously cut two edges of a continuously fed web of suitable material. However, that process is not suitable for producing 3-dimensional structures as shown in FIGS. 5 and 6.

Figure 7:
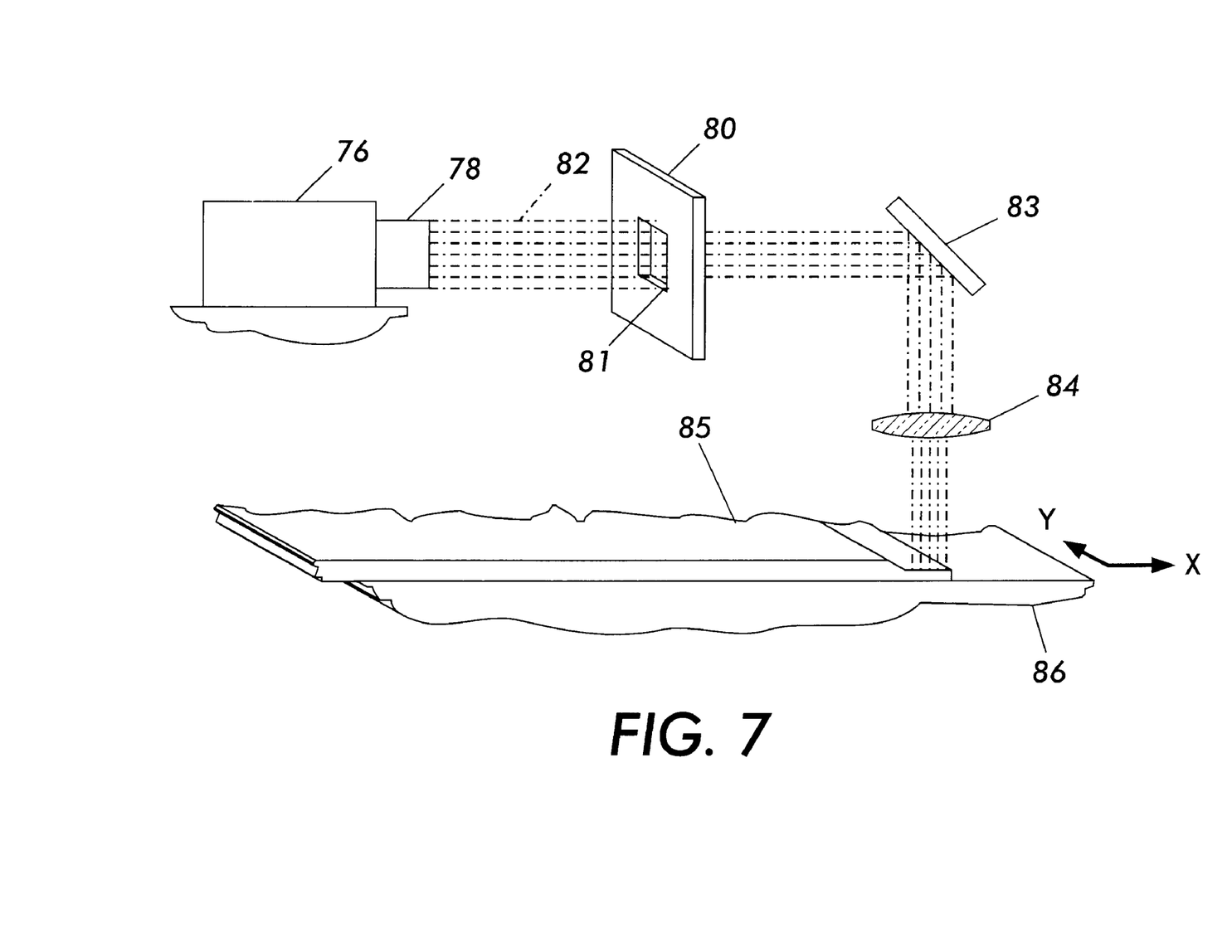
FIG. 7 shows a perspective, schematic view of a laser micro-machining system that is suitable for producing puzzle-cut seam structures.

One relatively simple, low cost process for continuous manufacture of puzzle-cut seamed intermediate transfer belts having 3-dimensional seam structures is laser micro-machining. FIG. 7 shows a perspective, schematic view of a suitable laser micro-machining system.

As shown in FIG. 7, a fixed laser 76 having beam-spreading optics 78 illuminates a quartz glass mirrored-surface 80 (or thin metal mask) bearing a mask 81 having a desired cutting pattern with a laser beam 82. The laser beam 82 passes through the mask only in the desired cutting pattern. Typically, the mask features are 2–10 times larger than the actual desired cutting pattern. For convenience, a mirror 83 directs the laser beam along a desired path. A focusing and de-magnification lens 84 is appropriately positioned in the desired path between the mask 81 and a belt substrate 85 that is being micro-machined. The lens 84 appropriately de-magnifies the cutting pattern such that the desired features can be cut into the belt substrate. The mask pattern causes the belt substrate to be illuminated with the shape of one or more features that are to be produced. For example, a rectangular cut can be laser milled in the belt edge by illuminating the belt substrate appropriately. A feature can be continuously cut across the width of the belt by moving the belt material using a vacuum stage X-Y platform 86, or by using some other suitable apparatus. Alternatively, the focused laser beam can be moved across the belt to continuously form the cut.

Complex structures can be cut using two or more masks, each mask having an appropriately sized feature. Features can then be successively aligned to produce the complex feature. For example, one mask might be used to cut a step along an edge of a belt substrate during a first pass, and then another mask might cut an embedded profile within that step during a second pass. Furthermore, the laser micro-machining process might use only one laser to process both ends of the belt, or plural lasers might be used. For example, a laser might be dedicated to each end of the belt, and/or multiple lasers might work on each end.

In any event, after the belt is laser micro-machined a suitable adhesive is placed over the mating surfaces, the puzzle-cut seams and their seam structures are interlocked, and then the adhesive is cured.

As will be readily understood by those skilled in the appropriate arts, the optimum laser system, energy density, and/or pulse repetition rates will depend upon the particular application. Significant variables include the particular belt material and its thickness, the required cutting/milling rate, the belt material motion, the pattern being produced, and the required feature accuracy. However, to provide a starting point, an ultraviolet (UV) laser having a wavelength of 248 nm or 192 nm will generally be suitable for cutting belts of polyaniline and carbon-black filled polyimide substrates, including those having polyanaline and or zeloc filled polyimide films. Suitable lasers include Excimer and triple frequency multiplied YAG lasers (which are believed capable of effectively producing suitable UV frequencies).

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method of fabricating a seamed belt comprising:

procuring a substrate sheet;

illuminating a first part of said substrate sheet with a laser beam to produce first desired features on said substrate sheet, wherein said first desired features include cutting said substrate sheet;

moving said substrate sheet relative to said laser beam such that a first puzzle cut pattern is fabricated along a first edge of said substrate sheet;

illuminating a second part of said substrate sheet with a laser beam to produce second desired features on said substrate sheet, wherein said desired features include cutting said substrate sheet;

moving said substrate sheet relative to said laser beam such that a second puzzle cut pattern is fabricated along a second edge of said substrate sheet;

overlapping and mating said first pattern with said second pattern to form a rabbeted joint; and bonding said first and second patterns to produce a seamed belt.

2. The method of fabricating a seamed belt according to claim 1, wherein illuminating a first part of said substrate sheet with a laser beam to produce first desired features on said substrate sheet includes:

generating a laser beam;

spreading said laser beam;

illuminating a pattered mask such that parts of said spread laser beam pass through said mask as machining light; and directing said machining light onto said first part of said substrate sheet.

3. The method of fabricating a seamed belt according to claim 1, wherein bonding includes placing an adhesive over the first and second puzzle cut patterns and curing the adhesive.

4. The method of claim 3, wherein the adhesive is a hot melt adhesive adhesive.

5. The method of claim 1 wherein the laser beam was produced by a triple frequency YAG laser.

6. A laser micro-machining system, comprising:

a laser producing a laser beam:

beam-spreading optics for spreading said laser beam into a plane on a quartz surface;

a mask on said surface, said mask having a desired cutting pattern wherein said spread laser beam passes through said mask according to said desired cutting pattern; and a belt substrate receiving said laser beam that passes through said mask;

wherein said laser beam received by said belt substrate forms a desired pattern on said belt substrate.

7. The laser micro-machining system according to claim 6, further including a mirror between said mask and said belt substrate.

8. The laser micro-machining system according to claim 6, further including a de-magnification lens between said mask and said belt substrate.

9. The laser micro-machining system according to claim 6, further including a mechanism for moving said belt substrate relate to said laser beam such that a pattern is formed on said belt substrate.

10. The laser micro-machining system according to claim 6, wherein said laser emits ultraviolet (UV) light.

11. The laser micro-machining system according to claim 10, wherein said light has a wavelength of 248 nm.

12. The laser micro-machining system according to claim 10, wherein said light has a wavelength of 192 nm.

13. The laser micro-machining system according to claim 10, wherein said laser is a excimer laser.

14. The laser micro-machining system according to claim 10, wherein said laser is a triple frequency multiplied YAG laser.

* * * * *